Figure 4:
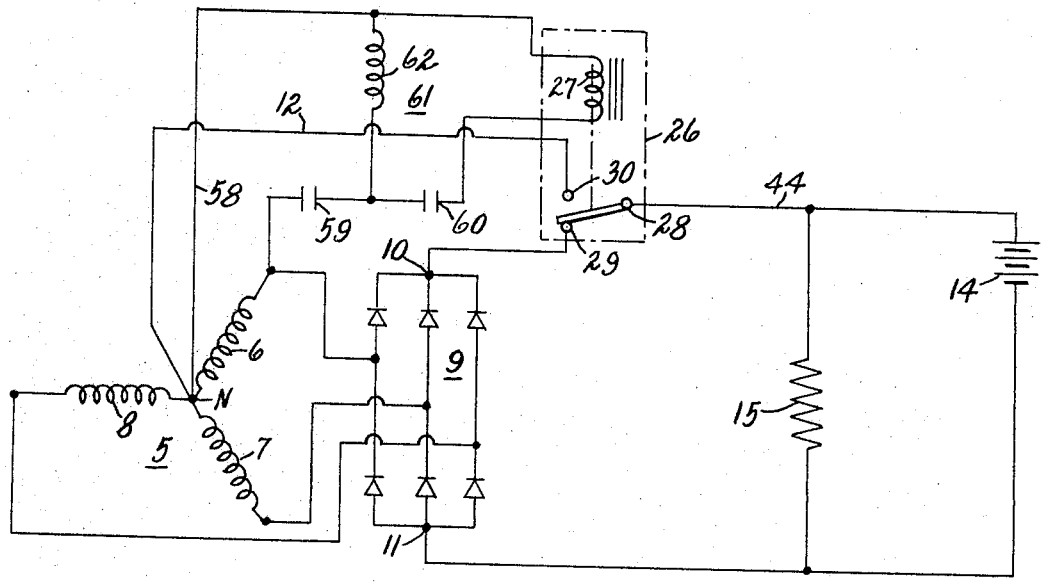

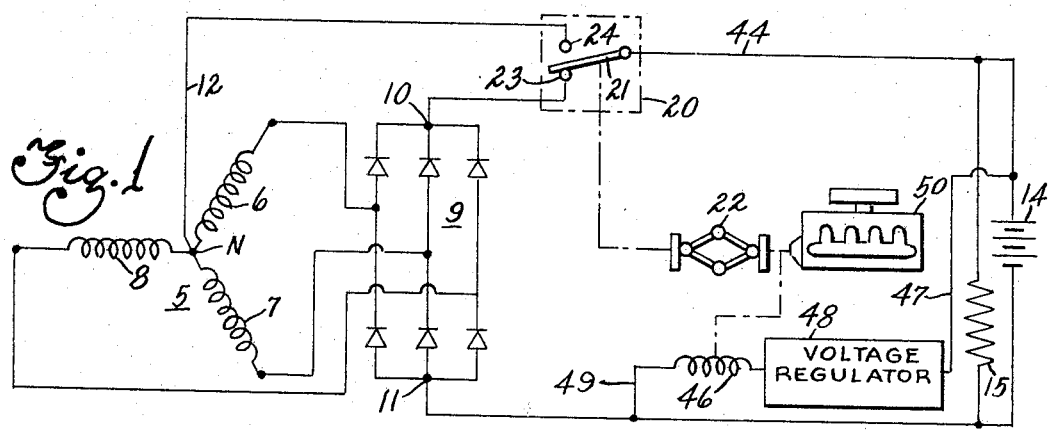
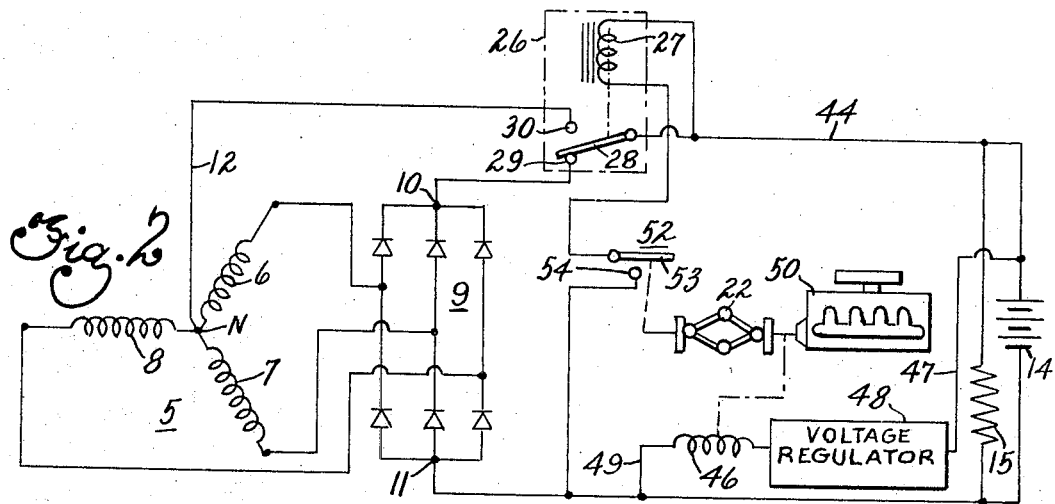
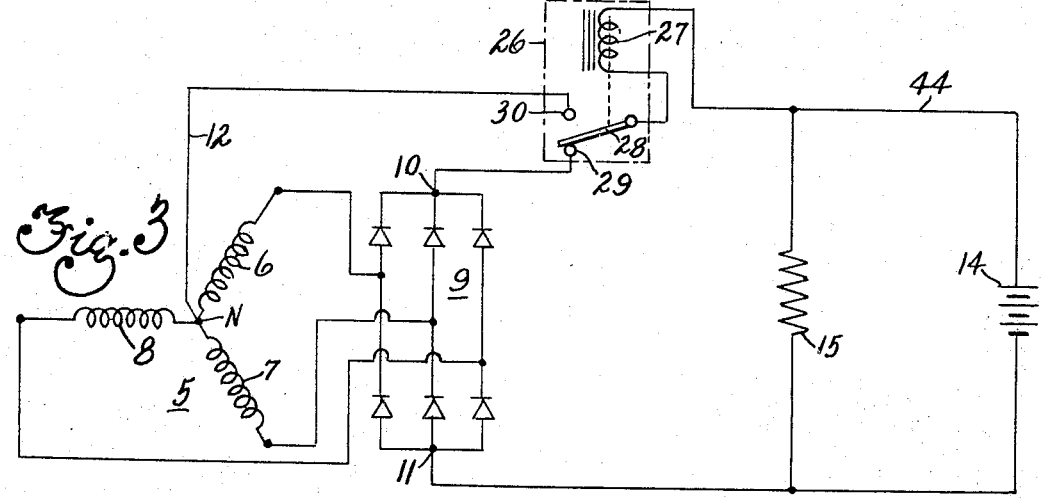
INVENTOR.
ELBERT M. SAWYER
BY
Richard G. Stahr
ATTORNEY Nov. 14, 1967 E. M. SAWYER 3,353,090
ALTERNATOR POWER SUPPLY SYSTEM WITH SPEED RESPONSIVE
RECTIFICATION ALTERING MEANS
Filed Dec. 8, 1965 2 Sheets-Sheet 2

INVENTOR.
ELBERT M. SAWYER
BY
Richard G. Stahr
ATTORNEY

United States Patent Office 3,353,090
Patented Nov. 14, 1967

3,353,090
ALTERNATOR POWER SUPPLY SYSTEM WITH SPEED RESPONSIVE RECTIFICATION ALTERING MEANS
Elbert M. Sawyer, Anderson, Ind., assignor to General Motors Corporation, Detroit, Mich., a corporation of Delaware
Filed Dec. 8, 1965, Ser. No. 513,669
10 Claims. (Cl. 322—30)

This invention relates to an alternator power supply system and, more specifically, to an electrical system which is operable to energize a connected electrical load with full wave rectified direct current or half wave rectified direct current in response to rotor speed.

A synchronous generator, which is operated over a wide range of rotor speeds, exhibits an inherent current limiting characteristic. As the rotor speed of the generator is increased, the output current approaches an asymptotic limit.

With many applications, it is necessary and desirable to extract additional power from the output windings of an alternating current generator to provide for increased loads which may be placed upon the system.

The maximum current output of a variable speed alternating current generator may be increased by switching the load from full wave rectified direct current to a half wave rectified direct current. With this change of connections, load current always flows in the same direction through each output winding of the generator.

It is, therefore, an object of this invention to provide an improved electrical system for use with an alternating current generator having three phase windings connected in a Y configuration for switching the connected load from full-wave rectified direct current energization to half-wave rectified direct current energization in response to rotor speed.

It is another object of this invention to provide an improved electrical system for use with an alternating current generator having three phase output windings connected in a Y configuration in combination with a full-wave bridge type rectifier circuit for switching at least one of the supply conductors from a selected polarity output terminal of the rectifier circuit to a neutral conductor connected to the electrical neutral of the Y connected output windings.

It is another object of this invention to provide an improved electrical system for use with an alternating current generator having three phase output windings connected in a Y configuration in combination with a full-wave bridge type rectifier circuit which includes a switch means for connecting a connected electrical load across the direct current output terminals of the bridge circuit and for dividing the electrical load and connecting respective portions thereof across respective output terminals of the bridge rectifier circuit and a neutral conductor connected to the electrical neutral of the Y connected output windings.

In accordance with this invention, an electrical system for increasing the output of a three phase, Y connected alternator in response to increase rotor speed is provided wherein a switching arrangement may be operated to energize a connected electrical load with full-wave rectified direct current at lower rotor speeds and with half-wave rectified direct current at higher rotor speeds.

Figure 5:
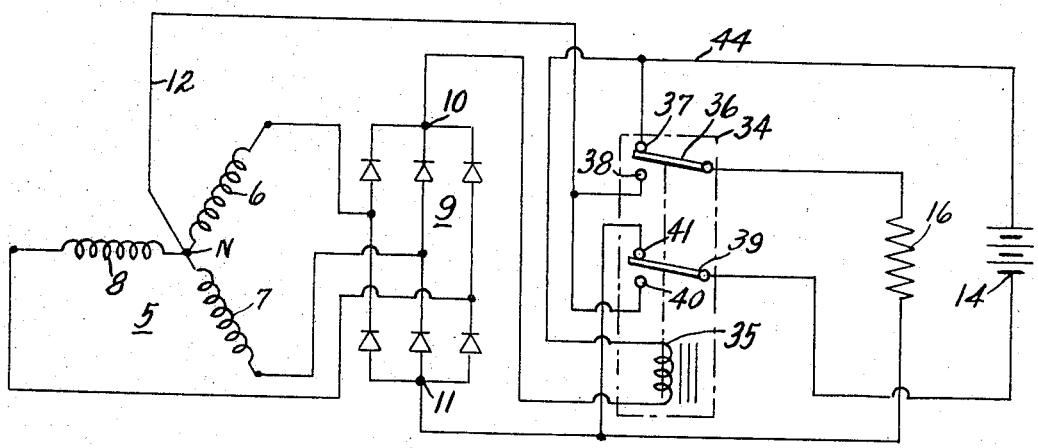

For a better understanding of the present invention together with additional objects, advantages and features thereof, reference is made to the following description and accompanying drawings in which:

FIGURE 1 is a schematic circuit diagram of the electrical system of this invention wherein the switching arrangement is operative in response to rotational speed of the rotor or the prime mover, FIGURE 2 is a schematic circuit diagram of another embodiment of the electrical system of this invention wherein the switching arrangement includes a centrifugal control device which is operative to energize the operating coil of an electrical relay, FIGURE 3 is a schematic circuit diagram of another embodiment of the electrical system of this invention wherein the switching arrangement is an electrical relay, the operating coil of which is responsive to current flow, FIGURE 4 is a schematic circuit diagram of another embodiment of the electrical system of this invention wherein the switching arrangement is an electrical relay, the operating coil of which is responsive to frequency, FIGURE 5 is a schematic diagram of another embodiment of the electrical system of this invention wherein the switching arrangement is operable to divide the electrical load.

Referring to the figures of the drawings wherein like elements have been given like characters of reference, several embodiments of the unique electrical system of this invention in combination with a three-phase, Y connected alternating current generator, generally referenced by the numeral 5, and a three-phase full-wave diode bridge type rectifier circuit, generally referenced by the numeral 9, is set forth in schematic form. The output windings of the three-phase alternating current generator are referenced by numerals 6, 7 and 8 throughout the figures and are shown to be connected to a Y configuration. Although each output winding is schematically represented as a single coil, it is to be specifically understood that each coil 6, 7 and 8 represents all of the coils of each output winding of the machine. The terminal end of each output winding is connected to a corresponding alternating current input terminal of the conventional three-phase, full-wave diode bridge type rectifier circuit 9 which is provided with a positive polarity direct current output terminal 10 and a negative polarity direct current output terminal 11 across which an electrical load may be connected. This portion of the circuitry of each figure is conventional in design and well known in the art.

The alternating current generator may be of any of the several types well known in the art which depend upon a rotatable rotor member to provide the relative motion between a magnetic field and the output windings which are linked by the magnetic field.

Although any type electrical load may be connected across the positive and negative output terminals 10 and 11, respectively, of the bridge rectifier circuit 9, it has been schematically illustrated as a conventional storage battery 14 and parallel connected resistor 15 in FIGURES 1 through 5, inclusive. As the switching arrangement of the embodiment of this invention as schematically set forth in FIGURE 5 operates to divide the connected electrical load, the electrical load has been schematically illustrated as a conventional storage battery 14 and a resistor 16. It is to be specifically understood that resistor 16 of FIGURE 5 is representative only and may be made up of any type electrical load such as electric lamps, motors or a combination thereof.

Connected to the electrical neutral "N" of the Y connected output windings is a neutral conductor 12 which is important for the operation of the electrical system of this invention.

As has been previously brought out, the maximum output current of an alternating current generator may be increased by energizing the connected electrical load with half-wave rectified direct current with the higher rotor speeds at which generator output current increases very slowly with increases of rotor speed. When used with the rectified alternating current power supply system of the type hereinabove described, the novel electrical system of this invention establishes a full-wave rectified direct current energizing circuit for the connected electrical load at low rotor speeds and operates to establish a half-wave rectified direct current energizing circuit for the connected electrical load at high rotor speeds.

The rotor speed at which it is desirable to transfer the connected electrical load from full-wave to half-wave rectified direct current energization is the value of rotor speed at which the output current begins to level. This speed is, of course, determined by the electrical characteristics of the specific alternating current generator with which the novel electrical system of this invention is being used.

With rotor speeds less than this predetermined value, the electrical load is connected across positive and negative polarity direct current output terminals 10 and 11 of bridge rectifier 9 and is energized by full-wave rectified direct current. With rotor speeds equal to or greater than the predetermined value when it is desirable to increase the maximum current output of the machine, the novel electrical system of this invention operates to connect the electrical load across either one of the direct current output terminals 10 or 11 of bridge rectifier 9 and neutral conductor 12. With this connection, the electrical load is energized by half-wave rectified direct current.

To accomplish this transfer of electrical load connections, a switching arrangement which is operable to energize the electrical load with full-wave rectified direct current or with half-wave rectified direct current is provided. As the maximum current output of the alternating current generator is required with rotor speeds greater than the predetermined value, this switching arrangement may be operated by any one of several control arrangements which are directly or indirectly responsive to the rotational speed of the rotor in a manner to be later explained.

The switching arrangement may be a switching device which normally closes the connected electrical load energizing circuit across output terminals 10 and 11 of rectifier circuit 9 and is operable to close the connected load energizing circuit across either output terminal 10 or 11 and neutral conductor 12 when the speed of the rotor member of the alternating current generator exceeds the predetermined value.

In FIGURE 1, the switching arrangement is illustrated as a single pole, double throw switch 20 having a movable contact 21 which may be operated to close to either of stationary contacts 23 or 24 by a centrifugal mechanism 22. In FIGURES 2 through 4, inclusive, the switching arrangement is illustrated as an electrical relay 26 having an operating coil 27 and a movable contact 28 which may be closed to either of stationary contacts 29 or 30. In FIGURE 5, this switching arrangement is illustrated as an electrical relay 34 having an operating coil 35, a movable contact 36 which may be closed to either of stationary contacts 37 or 38 and a movable contact 39 which may be closed to either of stationary contacts 40 or 41.

In FIGURES 1 through 4, inclusive, the switching arrangement is operable to connect a supply conductor 44, to which one side of an electrical load may be connected, to a selected one of direct current output terminals 10 or 11 of rectifier circuit 9 or neutral conductor 12.

In FIGURE 5, the switching arrangement is operable to connect the electrical load across direct current output terminals 10 and 11 of bridge rectifier circuit 9 and to divide the electrical load and connect respective portions thereof across positive polarity direct current output terminal 10 and neutral conductor 12 and negative polarity direct current output terminal 11 and neutral conductor 12.

In each of the FIGURES 1 through 4, inclusive, a respective control arrangement which is responsive, directly or indirectly, to the speed of the rotor of the alternating current generator is illustrated and each will be described in detail with the detailed description of the respective figure.

Referring to FIGURE 1, the rotor, not shown, of alternating current generator 5 may include a field coil 46 wound thereon which, when energized through line 47, voltage regulator 48 and line 49, produces a magnetic field which is magnetically coupled with output coils 6, 7 and 8, in a manner well known in the generator art. As the rotor is driven by a prime mover which may be an engine 50, the magnetic field produced by energized coil 46 links output windings 6, 7 and 8 of the alternating current generator thereby producing an alternating current potential therein which is full-wave rectified by bridge rectifier 9.

As the rotational speed of either the engine or the alternating current generator rotor increases above a predetermined value, centrifugal mechanism 22 operates the movable contact 21 of switch 20 to close the energizing circuit for the electrical load, battery 14 and resistor 15, to neutral conductor 12. With this connection, battery 14 and load 15 are energized by half-wave rectified direct current power.

Should the rotational speed of the prime mover or the alternating current generator rotor fall below the predetermined value, centrifugal mechanism 22 again operates movable contact 21 of switch 20 to close an energizing circuit for battery 14 and resistor 15 to output terminal 10. With this connection, battery 14 and resistor 15 are energized by full-wave rectified direct current power.

In FIGURE 2, relay 26 having an operating coil 27, a movable contact 28 which may be closed to either of stationary contacts 29 or 30 is substituted for switch 20. With this embodiment, with engine or rotor rotational speeds above a predetermined value, centrifugal mechanism 22 operates a single pole, single throw switch 52 having a movable contact 53 and a stationary contact 54. When centrifugal mechanism 22 operates movable contact 53 of switch 52 to establish an electrical contact with stationary contact 54, an energizing circuit for operating coil 27 of relay 26 is established. The energization of operating coil 27 operates movable contact 28 to close to stationary contact 30, thereby connecting supply conductor 44 to neutral conductor 12. With this connection, battery 14 and resistor 15 are energized by half-wave rectified direct current power.

As the rotational speed of the engine 50 or the rotor decreases below the predetermined value, centrifugal mechanism 22 operates to release the contact between movable contact 53 and stationary contact 54 of switch 52, thereby interrupting the energizing circuit for operating coil 27 of relay 26. With operating coil 27 unenergized, movable contact 28 returns to its normal position to establish contact with stationary contact 29 thereby connecting supply conductor 44 to the positive polarity output terminal 10 of bridge rectifier 9. With this connection, battery 14 and resistor 15 are energized by full-wave rectified direct current power.

The centrifugal mechanism 22 has been schematically represented in FIGURES 1 and 2. This device may be any of the several centrifugal mechanisms well known in the art which is responsive to rotational speeds. It is to be specifically understood that this device may be mounted upon a rotating element of engine 50 or it may be mounted upon the shaft of the rotor of the alternating current generator. One example of a device of this type is a common centrifugal switch which is customarily mounted upon the shaft of the rotor of the generator.

In FIGURE 3, an alternate embodiment of the electrical system of this invention is schematically set forth. In the interest of reducing drawing complexity, and since the switching arrangement is not responsive to rotary motion, the engine, the centrifugal mechanism and the rotor field coil, together with its energizing circuitry, have been omitted from this figure.

The switching arrangement of FIGURE 3 is illustrated as an electrical relay 26 having an operating coil 27 and a movable contact 28 which may be closed to either of stationary contacts 29 or 30. With normal operation, movable contact 28 is closed to stationary contact 29 thereby connecting supply conductor 44 to the positive output terminal 10 of bridge rectifier circuit 9. The operating coil 27 is connected in series in supply conductor 44 between movable contact 28 of relay 26 and resistor 15 and battery 14. With this connection, battery 14 and resistor 15 are energized by full-wave rectified direct current power with low speed operation or with normal load current.

As the current flow in supply conductor 44 increases with additional electrical load or, perhaps, with increased rotational speed of the alternating current generator rotor, sufficient ampere-turns are produced in operating coil 27 of relay 26 to close movable contact 28 to stationary contact 30, thereby connecting supply conductor 44 to neutral conductor 12. With this connection, battery 14 and resistor 15 are energized by half-wave rectified direct current power.

With this embodiment, the energizing coil 27 of relay 26 is selected to be such to produce the required ampere-turns with the magnitude of current flow which has been selected as a predetermined value.

FIGURE 4 schematically sets forth another embodiment of the electrical system of this invention wherein the switching arrangement is shown to be a relay 26 having an operating coil 27 which is responsive to generated potential frequency and a movable contact 28 which may be closed to either of stationary contacts 29 or 30.

As with FIGURE 3, in the interest of reducing drawing complexity, and since relay coil 27 is not responsive to the action of mechanical centrifugal devices, the engine, the centrifugal mechanism and the rotor field coil have been omitted from this figure.

It may be noted that operating coil 27 is connected across output winding 6 through lead 58 and series connected capacitors 59 and 60 of a high pass filter network generally shown at 61 which also include a shunt inductor 62. The high pass filter comprising series capacitors 59 and 60 and shunt inductor 62 is a configuration well known in the art. It is to be specifically understood that alternate high pass filter arrangements may be employed without departing from the spirit of the invention.

Filter network 61 is designed to pass sufficient current to energize operating coil 27 of relay 26 at a generated potential frequency which corresponds to the rotational speed of the alternating current generator rotor which has been selected as the predetermined value.

In normal operation, movable contact 28 of relay 26 is closed to stationary contact 29, thereby connecting supply conductor 44 to the positive polarity output terminal 10 of bridge rectifier circuit 9. With this connection, battery 14 and resistor 15 are energized by full-wave rectified direct current power.

As the rotational speed of the rotor of the alternating current generator increases above the predetermined value, high pass filter network 61 passes sufficient current at this frequency of the generated potential to produce sufficient ampere-turns in operating coil 27 of relay 26 to energize this device. With the operating coil 27 of relay 26 energized, movable contact 28 is closed to stationary contact 30 thereby connecting supply conductor 44 to neutral conductor 12. With this connection, battery 14 and resistor 15 are energized by half-wave rectified direct current power.

In the embodiments of FIGURES 1-4, the switching arrangement has been illustrated to connect supply conductor 44 to either the positive polarity output terminal 10 of the bridge rectifier circuit 9 or to neutral conductor 12. It is to be specifically understood that this switching arrangement may also be wired in such a manner to connect supply conductor 44 to either the negative polarity output terminal 11 of bridge rectifier circuit 9 or to neutral conductor 12.

FIGURE 5 schematically sets forth another embodiment of the electrical system of this invention which differs from the embodiments set forth in FIGURES 1-4, inclusive, to the extent that the switching arrangement connects an electrical load across the direct current output terminals 10 and 11 of bridge rectifier circuit 9 in one position and performs the dual function of dividing the electrical load and connecting respective portions thereof across the positive polarity direct current output terminal 10 and neutral conductor 12 and negative polarity direct current output terminal 11 of bridge rectifier circuit 9 and neutral conductor 12 in the other position.

The switching arrangement in FIGURE 5 is shown to be an electrical relay 34 having an operating coil 35, a movable contact 36 which may be closed to either of stationary contacts 37 or 38 and a movable contact 39 which may be closed to either of stationary contacts 40 or 41. In this embodiment, operating coil 35 is shown to be connected in series in supply conductor 44 between positive polarity output terminal 10 and battery 14. With this connection, operating coil 35 is selected to be current sensitive in the same manner as the operating coil 27 of relay 26 of the embodiment set forth in FIGURE 3. The electrical load is schematically represented in this figure to be a battery 14 and a resistor 16.

As with FIGURES 3 and 4, in the interest of reducing drawing complexity, the engine, centrifugal mechanism and rotor field coil have not been shown in FIGURE 5. It is to be specifically understood, however, that these elements may be employed and arranged in a manner similar to that set forth in FIGURES 1 and 2.

With low speed operation or with normal load current, movable contacts 36 and 39 of relay 34 are closed to respective stationary contacts 37 and 41. With this connection, the electrical load comprising battery 14 and resistor 16 are connected in parallel across positive polarity direct current output terminal 10 and negative polarity direct current output terminal 11 of bridge rectifier circuit 9.

As the current flow through supply conductor 44 increases with additional electrical load or, perhaps, with increased rotational speed of the alternating current generator rotor, sufficient ampere-turns are produced in operating coil 35 of relay 34 to close movable contacts 36 and 39 to respective stationary contacts 38 and 40. With this connection, the electrical load is divided and a portion thereof, battery 14, is connected between positive polarity direct current output terminal 10 of bridge rectifier circuit 9 and neutral conductor 12 and another portion thereof, resistor 16, is connected across negative polarity direct current output terminal 11 of bridge rectifier circuit 9 and neutral conductor 12.

With the embodiment of FIGURE 5, the operating coil 35 of relay 34 may be energized by control arrangements similar to those set forth in FIGURES 2 and 4. Relay 34 may also be replaced by a double pole, double throw switching arrangement which is operated by a centrifugal mechanism as schematically set forth in FIGURE 1.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. An electrical system comprising an alternating current generator having three-phase output windings connected in a Y configuration, a three-phase full-wave bridge type rectifier circuit having three alternating current input terminals and positive and negative polarity direct current output terminals, means for connecting the terminal end of each of said output windings to a respective alternating current input terminal of said bridge rectifier circuit, at least one supply conductor to which an electrical load may be connected, a neutral conductor connected to the electrical neutral of said Y connected output windings and a switch means for connecting said supply conductor to a selected one of said direct current output terminals or to said neutral conductor.

2. The electrical system as described in claim 1 wherein said switch means is operated by a control means.

3. The electrical system as described in claim 2 wherein said control means is responsive to the frequency of the alternating current potential generated in said output windings of said generator.

4. The electrical system as described in claim 2 wherein said control means includes a relay having an operating coil and a centrifugal mechanism operable to energize and de-energize said relay operating coil.

5. The electrical system as described in claim 2 wherein said control means includes a relay which is responsive to the magnitude of current flow in said supply conductor.

6. An electrical system comprising an alternating current generator having three-phase output windings connected in a Y configuration, a three-phase full-wave bridge type rectifier circuit having three alternating current input terminals and positive and negative polarity direct current output terminals, means for connecting the terminal end of each of said output windings to a respective alternating current input terminal of said bridge rectifier circuit, an electrical load, a neutral conductor connected to the electrical neutral of said Y connected output windings and a switch means for connecting said electrical load across said direct current output terminals and for dividing said electrical load and connecting respective portions thereof across said positive polarity direct current output terminal and said neutral conductor and said negative polarity direct current output terminal and said neutral conductor.

7. The electrical system as described in claim 6 wherein said switch means is operated by a control means.

8. The electrical system as described in claim 7 wherein said control means is responsive to the frequency of the alternating current potential generated in said output windings of said generator.

9. The electrical system as described in claim 7 wherein said control means includes a relay having an operating coil and a centrifugal mechanism operable to energize and de-energize said relay operating coil.

10. The electrical system as described in claim 7 wherein said control means includes a relay which is responsive to the magnitude of current flow in said supply conductor.

References Cited
UNITED STATES PATENTS

| | | | |
|---|---|---|---|
| 1,876,548 | 9/1932 | Atherton | 322—30 |
| 2,502,729 | 4/1950 | Klinkhamer | 321—8 |
| 3,217,228 | 11/1965 | Jardine | 320—22 |

MILTON O. HIRSHFIELD, *Primary Examiner.*

R. V. LUPO, *Assistant Examiner.*